(12) United States Patent
Bodin et al.

(10) Patent No.: US 7,430,583 B2
(45) Date of Patent: Sep. 30, 2008

(54) ACTIVE CONTROL OF COLLABORATIVE DEVICES

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1341 days.

(21) Appl. No.: 10/047,020

(22) Filed: Jan. 15, 2002

(65) Prior Publication Data
US 2003/0145053 A1 Jul. 31, 2003

(51) Int. Cl.
*G06F 15/16* (2006.01)

(52) U.S. Cl. .................. 709/209; 709/204; 709/208; 709/219

(58) Field of Classification Search ......... 709/201–203, 709/204–226; 340/573.1; 707/1
See application file for complete search history.

(56) References Cited

U.S. PATENT DOCUMENTS

| | | | |
|---|---|---|---|
| 4,477,733 A | 10/1984 | Herdeman | 307/35 |
| 4,505,259 A | 3/1985 | Seppanen et al. | 126/586 |
| 4,897,798 A | 1/1990 | Cler | 700/276 |
| 5,407,129 A | 4/1995 | Carey et al. | 236/91 E |
| 5,621,662 A | 4/1997 | Humphries et al. | 700/276 |
| 5,771,634 A | 6/1998 | Fudger | 47/62 N |
| 5,805,458 A | 9/1998 | McNamara et al. | 702/60 |
| 6,021,324 A | 2/2000 | Sizer, II et al. | 455/403 |
| 6,195,685 B1 | 2/2001 | Mukherjee et al. | 709/205 |
| 6,221,010 B1 | 4/2001 | Lucas | 600/300 |
| 6,353,848 B1 * | 3/2002 | Morris | 709/203 |
| 6,496,860 B2 * | 12/2002 | Ludtke et al. | 709/223 |

(Continued)

FOREIGN PATENT DOCUMENTS

WO    WO 00/77585    12/2000

(Continued)

OTHER PUBLICATIONS

Yamazaki et al., Design of collaborative agent system with access control for smart-office environment, Enabling Technologies; Infracture for Collaborative Enterprises, 2001, WET ICE 20 Tenth IEEE International Workshop on Jun. 20-22, 2001 pp. 205-210.*

(Continued)

*Primary Examiner*—Jason Cardone
*Assistant Examiner*—Thomas Duong
(74) *Attorney, Agent, or Firm*—Brandon C. Kennedy; Justin Dillon; Biggers & Ohanian, LLP

(57) ABSTRACT

Control of collaborative devices, including providing at least two collaborative devices, wherein each collaborative device comprises a client device and an embedded Java server, providing a registry service to which the collaborative devices are coupled for data communications, and providing at least one registry table, wherein the registry table includes registry records, wherein the registry records include registry records representing capabilities of collaborative devices, wherein the registry records representing capabilities of collaborative devices include data elements describing, for each collaborative device, capabilities, tertiary relationships, and network connectivities. The method further includes providing a service bundle of OSGI-compliant Java servlets comprising at least one predetermined algorithm for controlling the collaborative devices, and controlling the collaborative devices in accordance with the predetermined algorithm.

4 Claims, 5 Drawing Sheets

U.S. PATENT DOCUMENTS

| | | | |
|---|---|---|---|
| 6,677,858 B1* | 1/2004 | Faris et al. | 340/573.1 |
| 6,732,158 B1* | 5/2004 | Hesselink et al. | 709/208 |
| 6,848,101 B2* | 1/2005 | Maekawa et al. | 717/178 |
| 6,871,193 B1* | 3/2005 | Campbell et al. | 705/67 |
| 6,920,615 B1* | 7/2005 | Campbell et al. | 715/742 |
| 6,993,570 B1* | 1/2006 | Irani | 709/218 |
| 7,131,111 B2* | 10/2006 | Passanisi | 717/121 |
| 7,206,853 B2* | 4/2007 | Eytchison et al. | 709/230 |
| 2001/0032273 A1* | 10/2001 | Cheng | 709/249 |
| 2002/0052913 A1* | 5/2002 | Yamada et al. | 709/202 |
| 2002/0103898 A1* | 8/2002 | Moyer et al. | 709/224 |
| 2002/0188589 A1* | 12/2002 | Salmenkaita et al. | 707/1 |
| 2003/0014521 A1* | 1/2003 | Elson et al. | 709/225 |
| 2003/0061094 A1* | 3/2003 | Banerjee et al. | 705/14 |
| 2003/0074393 A1* | 4/2003 | Peart | 709/203 |
| 2003/0097410 A1* | 5/2003 | Atkins et al. | 709/206 |

FOREIGN PATENT DOCUMENTS

| | | |
|---|---|---|
| WO | WO 01/40938 | 6/2001 |

OTHER PUBLICATIONS

Yang Dongyong; Yuzo, Y.; "Multi-Sensor Data Fusion and Its Application to Industrial Control" Proceedings of the 39th SICE Annual Conference. Jul. 26/28, 2000; pp. 215-220.

* cited by examiner

|  | Device Name | Tertiary Relationship (320) | Capability (318) | Network Connectivities (URLs) (322) | Effects |
|---|---|---|---|---|---|
| 302 | Window Shade | Temperature Control | Raise Temp | \\192.168.0.2\servlet?function="up" | Raises Window Shade |
| 304 | Window Shade | Temperature Control | Lower Temp | \\192.168.0.2\servlet?function="down" | Lowers Window Shade |
| 306 | Heater | Temperature Control | Raise Temp | \\192.168.0.3\servlet?function="on" | Turns on furnace and blower |
| 308 | Heater | Temperature Control | Lower Temp | \\192.138.0.3\servlet?function="off" | Turns off furnace and blower |
| 310 | Air Conditioner | Temperature Control | Lower Temp | \\192.168.0.3\servlet?function="on" | Turns on A/C and blower |
| 312 | Air Conditioner | Temperature Control | Raise Temp | \\192.168.0.3\servlet?function="off" | Turns off A/C and blower |
| 314 | Thermometer | Temperature Control | Sensor | \\192.168.0.3\servlet?function="temp" | Returns Sensor Value of Internal |
| 316 | System | Temperature Control | Set Point | "73 to 77 degrees Fahrenheit" | Temp Control Set Point Range |

Figure 3

| Device Name | Tertiary Relationship | Capability | Network Connectivities (URLs) | Effect |
|---|---|---|---|---|
| Internet Weather Service | Temperature Control | Sensor-Outdoor Light Level | \\192.168.0.5\servlet?Latitude=MyLat + Longitude=MyLong | Returns Outdoor Light Level as Solar Index at Location |
| Window Shade | Temperature Control | Raise Temp-No Fossil Fuel | \\192.168.0.2\servlet?function="up" | Raises Window Shade |
| Window Shade | Temperature Control | Lower Temp-No Fossil Fuel | \\192.168.0.2\servlet?function="down" | Lowers Window Shade |

Figure 4

|  | 320 | 318 | 322 |  |
|---|---|---|---|---|
| Device Name | Tertiary Relationship | Capability | Network Connectivities (URLs) | Effect |
| Table Lamp | Living Room Illumination Control | On Low | \\192.168.0.4\servlet?TableLamp="on-Low" | Lamp on Low |
| Table Lamp | Living Room Illumination Control | On Medium | \\192.168.0.4\servlet?TableLamp="on-Med" | Lamp on Medium |
| Table Lamp | Living Room Illumination Control | On High | \\192.168.0.4\servlet?TableLamp="on-Hi" | Lamp on High |
| Table Lamp | Living Room Illumination Control | Off | \\192.168.0.4\servlet?TableLamp="off" | Lamp off |
| North Window Shade | Living Room Illumination Control | Up | \\192.168.0.6\servlet?function="up" | Raise North Window Shade |
| North Window Shade | Living Room Illumination Control | Down | \\192.168.0.6\servlet?Function="down" | Lower North Window Shade |
| West Window Shade | Living Room Illumination Control | Up | \\192.168.0.7\servlet?function="up" | Raise West Window Shade |
| West Window Shade | Living Room Illumination Control | Down | \\192.168.0.7\servlet?Function="down" | Lower West Window Shade |
| Photo-cell | Living Room Illumination Control | Sensor | \\192.168.0.8\servlet?function="LightLevel" | Returns Sensor Value |
| System | Temperature Control | Set Point | "800 to 1000 foot candles" | Returns Sensor Value |

Figure 5

ACTIVE CONTROL OF COLLABORATIVE DEVICES

BACKGROUND OF THE INVENTION

1. Field of the Invention

The field of the invention is data processing, or, more specifically, methods, systems, and products for active control of collaborative devices.

2. Description Of Related Art

A service gateway is an OSGI-compliant host server, server software installed and running on server computer hardware. "OSGI" refers to the Open Services Gateway Initiative, a computing industry organization developing specifications for service gateways, including specifications for delivery of "service bundles." OSGI service bundles are software middleware providing compliant data communications and services through service gateways. The Open Services Gateway specification is a java based application layer framework that gives service providers, network operator device makers, and appliance manufacturer's vendor neutral application and device layer APIs and functions. An "API" is an Application Program Interface, a set of routines, protocols, and tools for building software applications.

A service gateway usually is a home or business server, a separate computer coupled for data communications through a local area network or "LAN" to client devices. Client devices include any device capable of adaptation for data communications, including, for example, automobiles, vending machines, cash registers, gasoline pumps, RFID readers, clocks, window shade controllers, door locks, smoke detectors, proximity detectors, television sets, radios, electric light switches, thermostats, thermometers, air conditioners, heaters, medical monitoring equipment, refrigerators, cook tops on stoves, ovens, coffee makers, water heaters, and so on.

A service gateway usually is an embedded server inserted in a LAN not only for providing data communications among client devices, but also to connect a wide area network or "WAN," such as an external internet or extranet, to internal client devices within a home, office, or business setting. A service gateway often is an embedded server installed and running in the same physical device or cabinet with a client device.

"Embedded server" means a Java embedded server, a small-footprint application server that can be embedded in any networked device, home gateway, or client device. Embedded servers typically are zero-administration devices intended, when implemented as service gateways, to divide a network architecture into an external WAN and an internal LAN. An embedded server manages services deployed from trusted external resources to internal client devices over a network, including for example, services implemented through OSGI-compliant service bundles. Embedded servers enable deployment and installation of services, such as OSGI-compliant service bundles, on a just-in-time basis, when the services are needed from time to time for use by client devices.

All of the architecture so described, the service gateways, the service bundles, the client devices coupled through a LAN, the service gateway downloading service bundles when needed to provide services through a client device, all of this, has the effect of controlling individual client devices, with no collaboration among the devices. In the architecture so described, a user can, for example, log in to a service gateway and reset the desired temperature on a thermostat. The thermostat would then turn on a heater if, for example, the actual temperature were lower than the desired temperature. Raising a window shade on a warm, bright day, however, can also increase temperature in a room, and sunlight generally is both less expensive to operate than a heater and less environmentally demanding, although the benefits of reduced cost and reduced environmental impact are not available without collaboration among individual devices. If a first raised window shade were insufficient, then a second could be raised. If window shade raising without the use of a heater were insufficient, then the heater could be turned on, perhaps requiring less fuel consumption now that the raised window shades have contributed to the heating of the room. This simple example illustrates that it would be advantageous to have ways of controlling client devices so that they collaborate, bringing multiple resources to bear upon subjects of control.

SUMMARY

Exemplary embodiments of the invention include methods of control of collaborative devices. Exemplary embodiments typically include providing at least two collaborative devices, wherein each collaborative device includes a client device and an embedded Java server, and providing a registry service to which the collaborative devices are coupled for data communications. Exemplary embodiments typically include providing at least one registry table, wherein the registry table typically includes registry records, wherein the registry records include registry records representing capabilities of collaborative devices, wherein the registry records representing capabilities of collaborative devices typically include data elements describing, for each collaborative device, capabilities, tertiary relationships, and network connectivities. Other exemplary embodiments typically include providing a service bundle of OSGI-compliant Java servlets including at least one predetermined algorithm for controlling the collaborative devices, and controlling the collaborative devices in accordance with the predetermined algorithm.

In typical embodiments of the invention the predetermined algorithm is dedicated to a particular tertiary relationship. Exemplary embodiments of the predetermined algorithm typically include finding a registry record bearing a set point for the particular tertiary relationship, reading a sensor value of the particular tertiary relationship, and comparing the set point and the sensor value, wherein the comparing produces a comparison result. Other exemplary embodiments of the predetermined algorithm typically include finding, in dependence upon the comparison result, a registry record having an identified capability appropriate to the comparison result for the particular tertiary relationship, and effecting the capability identified in the found registry record.

In exemplary embodiments of the invention effecting the capability identified in the found registry record typically includes requesting, by use of an HTTP request, a URL identified in the found registry record as a network connectivity. In some exemplary embodiments, reading a sensor value typically includes finding a registry record for a sensor for the particular tertiary relationship, and effecting the capability identified in the found registry record for the sensor. In other exemplary embodiments, effecting the capability identified in the found registry record for the sensor typically includes requesting, by use of an HTTP request, a URL identified in the found registry record for the sensor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 is an illustration of exemplary embodiments of registry records.

FIG. 4 is a further illustration of exemplary embodiments of registry records.

FIG. 5 is a still further illustration of exemplary embodiments of registry records.

DETAILED DESCRIPTION OF EXEMPLARY EMBODIMENTS

Introduction

Figure 1:
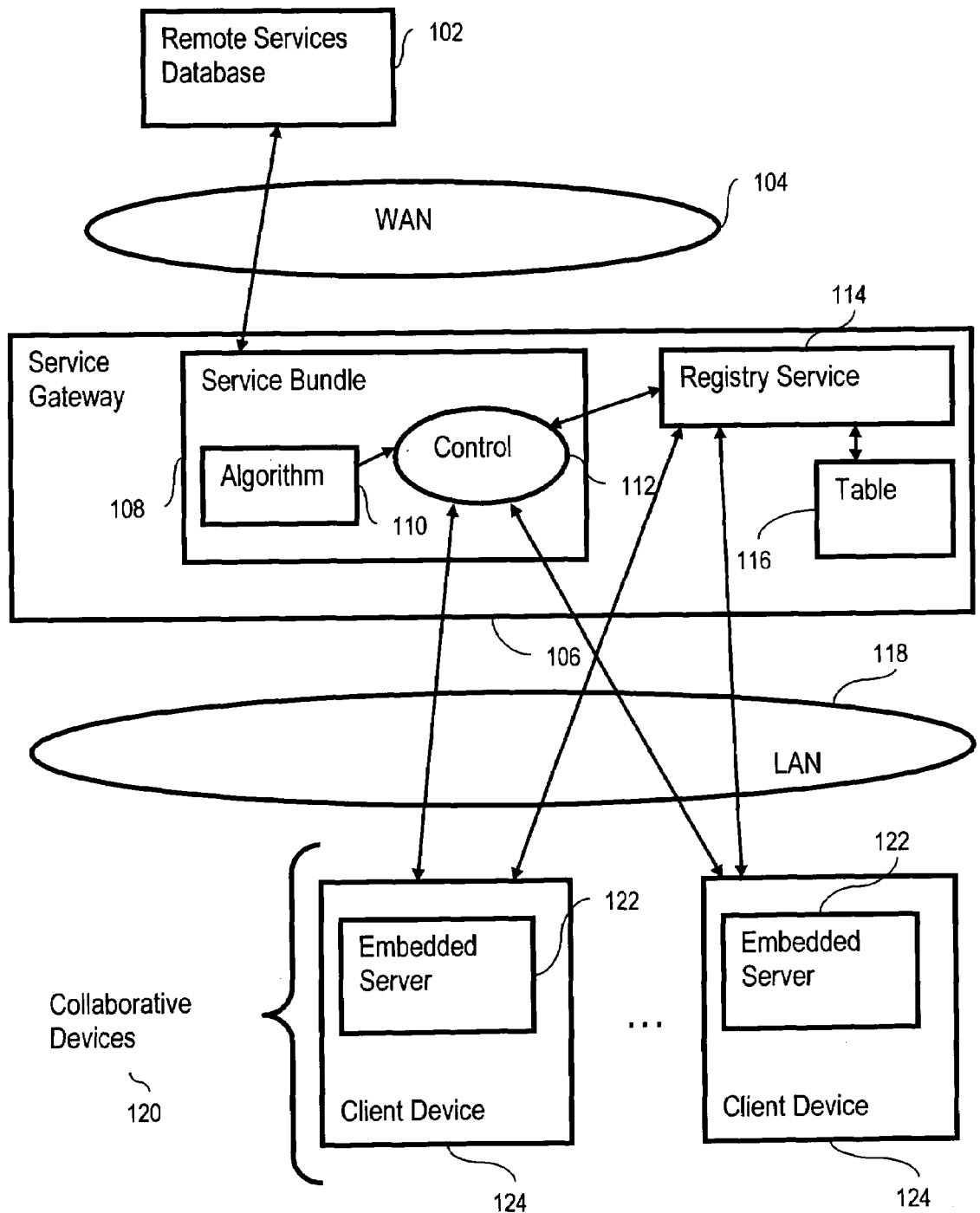
FIG. 1 is a high level block diagram of the principal components of an exemplary embodiment.

The present invention is described to a large extent in this specification in terms of methods for active control of collaborative devices. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

In this specification, the terms "field," "data element," "attribute," and "code" are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

"Coupled for data communications" means any form of data communications, wireless, 802.11 lb, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, and other forms of data communications as will occur to those of skill in the art. Couplings for data communications include network connections implemented by use of power line protocols such as, for example, "HomePlug," "X-10," "CEBus," and "Lonworks."

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among service gateways, client devices, registries, or repositories of registry records, such as, for example, database management systems comprising registry records, is well within the scope of the present invention.

"Network address" means any network address useful to locate on any network a registry service, registry records, client devices, or capabilities whose locations are identified by connectivities or URLs. Network addresses include any internet protocol address useful to locate a registry service, registry records, client devices, or capabilities whose locations are identified by connectivities or URLs on an internet. Network addresses useful with various embodiments of the invention include local internet protocol addresses, private internet protocol addresses, temporary Internet addresses assigned to a Web client by a DHCP server, and permanent, official registered Internet addresses associated with domain names. "DHCP" is the Dynamic Host Configuration Protocol.

"URL" means Uniform Resource Locator, a standard method of associating network resource locations with network addresses for data communications, and, in the case of servlets, for invoking functions or operations of the resources.

"World Wide Web," or more simply "the Web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

"Browser" means a Web browser, a software application for locating and displaying Web pages. Typical browsers today can display text, graphics, audio and video.

A "Web site" is a location on the World Wide Web. Web sites are identified by domain names that resolve to Internet addresses. Web sites include storage locations identifiable by URLs. Web sites are implemented in, on, and as part of Web servers, that is, HTTP servers. Web sites are aggregations of computer software installed and operating on computer hardware.

Detailed Description

FIG. 1 is used to illustrate a method of control of collaborative devices in which the method includes providing at least two collaborative devices (120). In the illustrated example embodiment, each collaborative device includes a client device (124) and an embedded Java server (122). The example embodiment illustrated through FIG. 1 includes providing a registry service (114) to which the collaborative devices (120) are coupled for data communications. In the illustrated example embodiment, the couplings for data communications between the registry service and the collaborative devices are effected through a LAN (118).

The illustrated embodiment includes providing at least one registry table (116), wherein the registry table further comprises registry records having the structure illustrated for example, at references (302-316) on FIG. 3. Registry records have alternative structures across embodiments. In the structures illustrated in FIG. 3, however, the registry records include registry records representing capabilities of collaborative devices, and the registry records representing capabilities of collaborative devices further include data elements describing for each collaborative device, capabilities (318), tertiary relationships (320), and network connectivities (322).

The registry records are established initially, for example, by user data entry through a data entry screen and a keyboard on a computer terminal logged on to a service gateway and a registry service, or by a registry service reading at startup registry records from non-volatile computer memory, or by a registry service downloading across a WAN registry records at startup from remote databases, or by a registry service uploading registry records from collaborative devices when collaborative devices are powered up. These are several example of embodiments for establishing registry records. Person of skill in the art will think of other ways of establishing registry records, all such ways being well within the scope of the present invention.

The illustrated embodiment of FIG. 1 includes providing a service bundle (108) of OSGI-compliant Java servlets comprising at least one predetermined algorithm (110) for controlling the collaborative devices. The service bundle (108) is shown on FIG. 1 as a download across a WAN (104) from a remote storage location, the remote services database (102). Alternatively, in other embodiments, the service bundle is loaded from a recording medium such as a compact disk or diskette, for storage in computer memory on the service gateway itself. Or the service bundle in other embodiments is uploaded from a client device. Persons skilled in the art will think of other ways of acquiring service bundles, all such ways being well within the scope of the present invention.

The example of FIG. 1 includes controlling (112) the collaborative devices in accordance with the predetermined algorithm. In most embodiments, the means for control is a computer processor coupled to computer memory in which is stored the predetermined algorithm as part of a service bundle, a computer program stored in computer memory and operated to control the computer processor.

Figure 2:
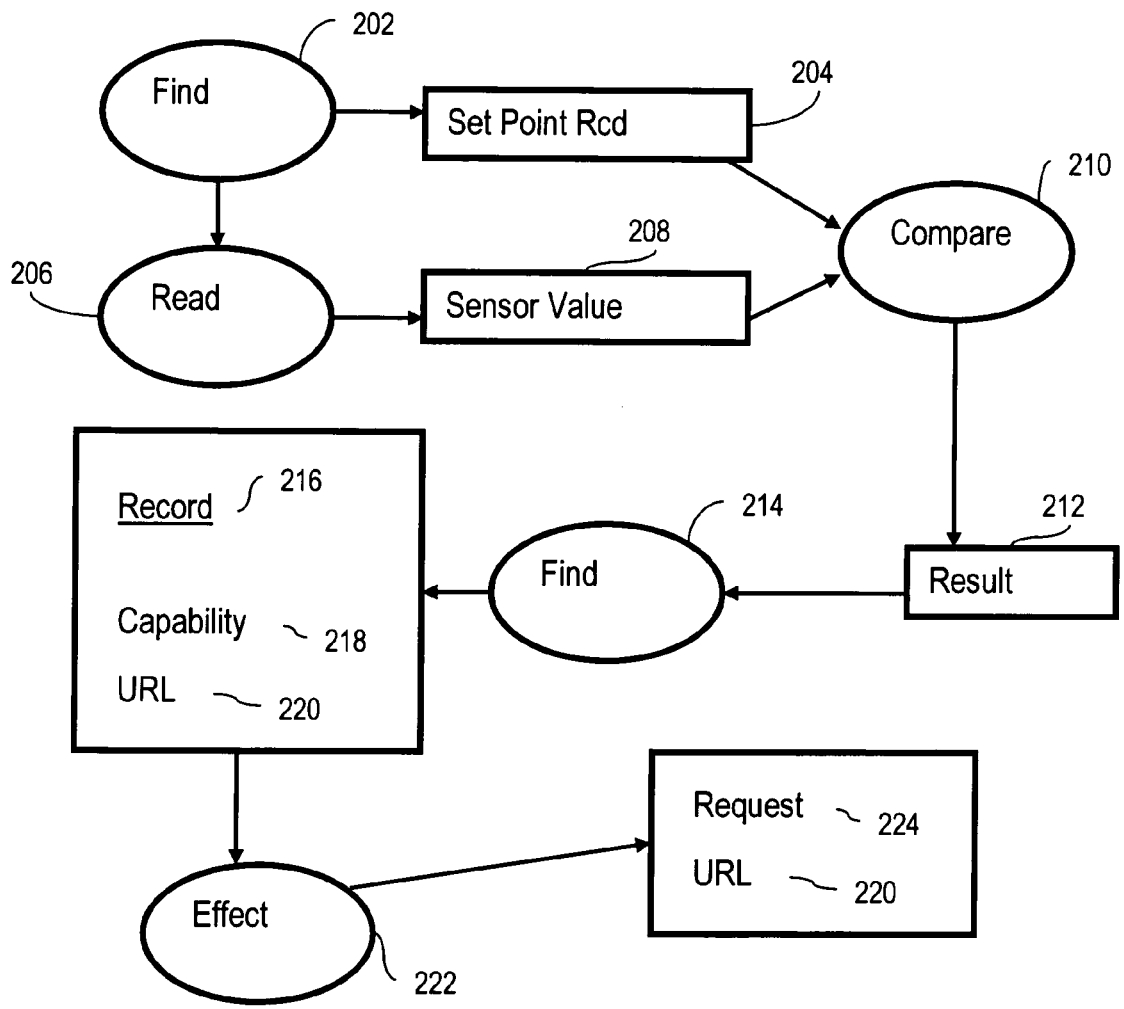
FIG. 2 is a control flow diagram of an exemplary embodiment of an algorithm for control of collaborative devices.

In the further example illustrated in FIG. 2, a predetermined algorithm (110) is dedicated to a particular tertiary relationship (320). That is, the predetermined algorithm is dedicated, for example, to "Temperature Control," the exemplary tertiary relationship (320) of FIG. 3. In the example of FIG. 2, the predetermined algorithm includes finding (202) a registry record (204) bearing a set point for a particular tertiary relationship, which is taken for purposes of this example as "Temperature Control."

The example predetermined algorithm includes reading (206) a sensor value (208) of the particular tertiary relationship, comparing (210) the set point and the sensor value, wherein the comparing produces a comparison result (212), and finding (214), in dependence upon the comparison result, a registry record (216) having an identified capability (218) appropriate to the comparison result for the particular tertiary relationship. Reading (206) a sensor value, in typical embodiments, includes finding a registry record for a sensor for the particular tertiary relationship and effecting (222) the capability identified in the found registry record for the sensor. More specifically, in the illustrated example, reading a sensor value includes finding a registry record (314) for the particular tertiary relationship ("Temperature Control") having a capability of "sensor." Reading a sensor value then includes transmitting an HTTP request for the URL identified in that found registry record as a network connectivity of the capability in the record. The found registry record (314) in this example in effect means to the algorithm, "Obtain the current sensor value from this URL."

The transmitted HTTP request message in the present example include the following URL from registry record (314):

\\92.168.0.3\servlet?function="temp"

This exemplary URL, in the present example embodiment, is delivered to the embedded Java server embedded in the collaborative device located on the LAN at the network address \\192.168.0.2. The URL invokes a servlet that accepts a parameter named "function," which in this invocation is assigned the value "temp," requesting the current temperature. The call to the servlet returns the temperature to the embedded Java server. The embedded Java server configures and returns an HTTP response message including the current temperature.

Comparing the set point, in the example embodiment, includes finding a set point record. More specifically, in the present example embodiment, comparing the set point includes discovering what the set point is. In the present example, the set point is found in the connectivity field (322) of a registry record (316) identified by the tertiary relationship and the capability "set point." In this specific example of a set point, the connectivity field is used to identify a literal value rather than to identify a remote connection to a source of a value. Other embodiments, rather than a literal value in the connectivity field, include in the connectivity field for a set point a URL identifying a remote location of a source of a set point value. In this particular example embodiment, the set point is a range, "73 to 77 degrees Fahrenheit."

Comparing (210) the set point and the sensor value produces a comparison result (212). For purposes of this example, it is assumed that the comparison result is that the sensor value indicates a current temperature below the set point range and therefore a raise in temperature is needed. Finding (214), in dependence upon the comparison result, a registry record (216) having an identified capability (218) appropriate to the comparison result for the particular tertiary relationship includes in the present example, finding a registry record for the tertiary relationship, in this case "Temperature Control," having the capability "Raise Temp." The first such registry record in the example registry records of FIG. 3 is the record having reference number (302). Two other records in FIG. 3 meet these criteria also, record (306) in which is identified the capability of turning on a heater and record (312) in which is identified the capability of turning off an air conditioner.

The example algorithm of FIG. 2 includes effecting (222) the capability identified in the found registry record, which in the case of the present example embodiment as illustrated also in FIG. 3, includes requesting (224), by use of an HTTP request, a URL (220) identified in the found registry record as a network connectivity. More specifically, in our specific example of raising temperature by raising a window shade, the capability identified in example registry record number (302), the HTTP request message includes the URL from the connectivity field (322) of record number (302), that is:

\\192.168.0.2\servlet?function="up"

This example form of URL includes the network address, "\\192.168.0.2," of the client device upon which is located a Java servlet accepting as a parameter a variable called "function." In this example, the value passed as the value of the parameter variable is "up." To lower the window shade, as illustrated at registry record number (304) on FIG. 3, the valued of the parameter "function" is set to "down."

In this example embodiment, the servlet identified in the connectivity field of the registry record is a Java servlet operating an automated electromechanical interface to a motor that raises and lowers a window shade. The Java servlet so identified is a servlet operating in conjunction with an embedded Java server that is physically and electronically embedded upon the motor controlling the window shade. The embedded Java server is coupled for data communication through a LAN to the service gateway and the registry service. The coupling for data communications is implemented in some embodiments through a metal data wire, in other embodiments through a wireless connection such as an 802.11(b) connection or a Bluetooth connection, and in other embodiments through a power line protocol such as Home-Plug, X-10, CEBus, or Lonworks.

Note that the URLs the heater, air conditioner, and thermometer identified in registry records 306, 308, 310, 312, and 314, in FIG. 3, all have the same network address, "192.168.0.3." In this particular example, all these URLs have the same network address because they all call servlets in the same embedded Java server embedded on the same thermostat. In other embodiments, the heater controls, air conditioner controls, and thermometer as a sensor are all separate client devices having separate embedded servers forming separate collaborative devices located at separate network addresses.

A further example embodiment of a predetermined algorithm includes the method steps illustrated in the following pseudocode:

```
Control_Algorithm( Tertiary Relat = "Temperature Control",
        Wait_Time = 60 seconds)
{
    //find sensor record for the tertiary relationship
    Sensor_record = find_sensor_record(Tertiary_Relat);
    //loop while sensor value is outside set point range
    while(
        (Sensor_value = read_value(Sensor_record.Connectivity)
        < (Setpoint = find_set_point(Tertiary_Relat))
        or
        (Sensor_value > Set_point))
    {
        Capability_needed = compare(Sensor_value, Set_point);
        Action_record =
            find_next_registry_record(RegistryRecord.Capability =
            Capability_needed);
        Effect(Action_record.Connectivity);
        Wait(Wait_Time);
    }
}
```

The Control_Algorithm() function itself, in typical example embodiments, is set to run in a continuous loop, so that its operation includes continuously comparing a set point to a sensor value and taking action in dependence upon the results of the comparison. The set point is checked on each recursion of the control loop because a user can reset a set point or a set point range at any time. Users can reset set point, for example, by use of data entry screens and keyboards on computer terminals logged on to the service gateway and the registry service. Alternatively, users can change set points by use of client devices themselves, such as thermostats with embedded Java servers whose functions include reporting to a registry service changes in set points detected on a thermostat switch. Many ways of setting set points and set point ranges will occur to those of skill in the art, all such ways being well within the scope of the present invention.

The compare() function, in examples of this kind, returns, for example, the Capability_needed of "Raise Temp" when the sensor value is less than the set point and the Capability_needed of "Lower Temp" when the sensor value is greater than the set point. The Wait() function pauses operation for long enough to give effect to the mechanical and thermal changes effected before again checking set point and sensor value.

The Wait_Time, like the tertiary relationship for the algorithm, is set by parameter when the Control_Algorithm() function is called. In this particular example, the use of passed parameters at run time means that this particular form of algorithm, the function Control_Algorithm(), is useful for a wide variety of embodiments using set points. Of course there is no general requirement for set points in the present invention, and many embodiments do not use set points. This kind of algorithm, however, is useful for many that do.

The registry records in FIG. 3 illustrate also an implementation of a control policy preferring non-fossil fuel capabilities for heating to those requiring fossil fuels. The policy is implemented in the records of FIG. 3 by virtue of the ordering of the records. That is, an algorithm of the "find_next" kind when seeking "Raise Temp" as a capability will find record (302) before record (306), assuming the records are sorted or indexed in the order shown in FIG. 3. If records favoring non-fossil-fuel heating appear in the sort order or index order before records enabling fossil fuel usage for heating, the policy is effected. But there are other ways of effecting control policies.

Illustrated by use of FIG. 4 is a further embodiment addressed to the tertiary relationship of "Temperature Control." More specifically, the registry records (402, 404, 406) shown in FIG. 4 add to the registry records for "Temperature Control" a sensor capability for outdoor light levels and capabilities of raising and lowering temperatures without the use of fossil fuel. In this example, data identifying fossil fuel effects are expressly included in the registry record data, thus supporting predetermined algorithms of the kind illustrated by the following pseudocode:

```
Control Algorithm( Tertiary_Relat = "Temperature Control",
        Wait_Time = 60 seconds)
{
    //find sensor record for the tertiary relationship
    Sensor_record = find_sensor_record(Tertiary_Relat);
    //loop while sensor value is outside set point range
    while(
        (Sensor_value = read_value(Sensor_record.Connectivity)
        <(Set_point = find_set_point(Tertiary_Relat))
        or
        (Sensor_value > Set_point))
    {
        Capability_needed = compare(Sensor_value, Set_point);
        if(((Action_record =
            find_next_NON-FOSSIL_record(
            RegistryRecord.Capability = Capability_needed)) ==
            NULL)
            find_next_FOSSIL_record( RegistryRecord.Capability =
                Capability_needed);
        Effect(Action_record.Connectivity);
        Wait(Wait_Time);
    }
}
```

In order for the find_next_NON-FOSSIL_record( ) function to be able to return a NULL when no further non-fossil-fuel capabilities remain available, the registry record structure in such embodiments typically is extended to include a status field for each registry record (not shown). In this kind of embodiment, the Effect( ) function or the find_next_NON-FOSSIL_record( ) function in such embodiments marks each registry record status as "on" or "in use" when the record is found or when the capability represented by each record is effected, so that the find_next_NON-FOSSIL_record( ) knows upon the next iteration through the loop whether it can find a non-fossil capability still available for use.

Also illustrated by use of FIG. 4 is a still further embodiment addressed to the tertiary relationship of "Temperature Control." More specifically, the registry records (402, 404, 406) shown in FIG. 4 add to the registry records for "Temperature Control" a sensor capability for outdoor light levels and capabilities of raising and lowering temperatures without the use of fossil fuel. By use of these kinds of registry records, it is possible to implements more sophisticated embodiments, embodiments that operate, for example, in dependence upon outdoor illumination levels sensed, not through outdoor photocells, but from weather services provided over the Internet. In this example, data identifying fossil fuel effects are expressly included in the registry record data, thus supporting predetermined algorithms of the kind illustrated by the following pseudocode:

```
Control_Algorithm( Tertiary_Relat = "Temperature Control",
           Wait_Time = 60 seconds,
           MyLat = "384012",
           MyLong = "452032",
           Target_Index = 8)
{
       //find sensor record for the tertiary relationship
       Sensor_record = find_sensor_record(Tertiary_Relat);
       //loop while sensor value is outside set point range
       while(
       (Sensor_value = read_value(Sensor_record.Connectivity)
       < (Set_point = find_set_point(Tertiary_Relat))
       or
       (Sensor_value > Set_point))
    {
       Capability_needed = compare(Sensor_value, Set_point);
       AddlSnsrRcd = find_record(Tertiary_Relat, Capability =
           "Sensor — Outdoor Light Level");
       if( (Solar_Index = AddlSnsrRcd.Connectivity(MyLat,
           MyLong)) > Target_Index
           and
           Capability_needed includes "Raise Temp")
       {
           if(((Action_record =
               find_next_NON-FOSSIL_record(
               RegistryRecord.Capability =
               Capability needed)) == NULL)
               find_next_FOSSIL_record(
                   RegistryRecord.Capability =
                   Capability needed);
       }
       else find_next_FOSSIL_record( RegistryRecord.Capability =
           Capability_needed);
       Effect(Action_record.Connectivity);
       Wait(Wait_Time);
    }
}
```

The embodiment illustrated by this pseudocode includes an additional step of checking outdoor light level by finding an additional sensor record (402), a record identifying a capability of sensing outdoor light levels. The capability identified by this 'sensor record,' a registry record identifying a capability of returning a value rather than taking action, is not reading a photocell, however. Instead, the capability identified by this record is a call to an Internet-based weather service, a remote Internet location or web site providing generally the service of reporting upon request, an HTTP request, that is, the solar index at a latitude and longitude included as parameters in the request. Thus the logic of the algorithm becomes, for embodiments of this kind: If heat is needed and there is enough sunshine outside to make it worthwhile, look for a non-fossil fuel capability, otherwise go ahead and turn on the heater.

We conclude with an additional example embodiments, illustrated by use of FIG. 5. FIG. 5 illustrates an embodiment for the tertiary relationship "Living Room Illumination Control." The example embodiment of FIG. 5 is included to show that, despite the fact that the example embodiments of FIGS. 3 and 4 are directed to "Temperature Control," in fact, embodiments of the invention address many more tertiary relationships than just "Temperature Control." The embodiment of FIG. 5, for example, includes capabilities among collaborative devices for sensing levels of illumination, raising and lowering window shades, and for turning on and off electric lights. We have shown a variety of example embodiments of tertiary relationships, including examples for temperature control and illumination control. Many alternative tertiary relationships will occur to those of skill in the art, and all such tertiary relationships are well within the scope of the present invention.

It will be understood from the foregoing description that various modifications and changes may be made in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method of control of collaborative devices, the method comprising the steps of:

providing at least two collaborative devices, wherein each collaborative device comprises a client device and an embedded Java server;

providing a registry service to which the collaborative devices are coupled for data communications;

providing at least one registry table, wherein the registry table further comprises registry records, wherein the registry records comprise registry records representing capabilities of collaborative devices, wherein the registry records representing capabilities of collaborative devices further comprise data elements describing, for each collaborative device, capabilities, tertiary relationships, and network connectivities;

providing a service bundle of OSGI-compliant Java servlets comprising at least one predetermined algorithm for controlling the collaborative devices; and controlling the collaborative devices in accordance with the predetermined algorithm, wherein the predetermined algorithm is dedicated to a particular tertiary relationship, and the predetermined algorithm comprises the further steps of:

finding a registry record bearing a set point for the particular tertiary relationship;

reading a sensor value of the particular tertiary relationship;

comparing the set point and the sensor value, wherein the comparing produces a comparison result;

finding, in dependence upon the comparison result, a registry record having an identified capability appropriate to the comparison result for the particular tertiary relationship;

effecting the capability identified in the found registry record.

2. The method of claim 1 wherein effecting the capability identified in the found registry record includes requesting, by use of an HTTP request, a URL identified in the found registry record as a network connectivity.

3. The method of claim 1 wherein reading a sensor value further comprises the steps of:

finding a registry record for a sensor for the particular tertiary relationship;

effecting the capability identified in the found registry record for the sensor.

4. The method of claim 3 wherein effecting the capability identified in the found registry record for the sensor includes requesting, by use of an HTTP request, a URL identified in the found registry record for the sensor.

* * * * *